April 22, 1941.  H. W. STRONG  2,239,346

MANTLE

Filed May 27, 1939

INVENTOR.
HIRAM W. STRONG
BY Charles R. Werner
ATTORNEY.

Patented Apr. 22, 1941

2,239,346

UNITED STATES PATENT OFFICE 2,239,346

MANTLE

Hiram W. Strong, Wichita, Kans., assignor to The Coleman Lamp and Stove Company, Wichita, Kans., a corporation Application May 27, 1939, Serial No. 276,188

12 Claims. (Cl. 67—98)

This invention relates to mantles for incandescent lamps and has for its objects, first; to provide a mantle in which the threads are so arranged as to provide a maximum light radiating area for each thread and thereby reduce interference from adjacent threads, resulting in high light radiating efficiency from the mantle as a whole.

Second; to provide a mantle in which the threads are so arranged as to create a "truss" structure, affording greater strength to the mantle and consequently providing for longer life.

Third; to provide a mantle in which the lower, radiating portion is formed of an openwork, "duplex" stitch, and the upper portion is formed of a "simplex" or single thread, closely knitted stitch, whereby the making of the mantle is simplified and the cost lowered.

In carrying out the first object of my invention it was found that in mantles in which the threads were bunched or unevenly distributed, large open spaces were present and the closely knitted threads would not efficiently radiate light, each thread being capable of performing only a small percentage of its work due to the close proximity of adjacent threads.

In designing my mantle, therefore, the importance of spacing the threads to provide an open mesh with a maximum light radiating area for each thread, was paramount, consistent, of course, with manufacturing requirements.

It is well known that mantles are extremely fragile and during transportation or use are very susceptible to being damaged. In considering my second object means were sought for increasing the structural strength of the mantle and thereby decreasing the possibility of damage. With the knowledge that a truss structure is considered as possessing great strength, the "truss" principle was incorporated in the knitting of the mantle so as to provide longitudinal members, upright members, and diagonal members, providing the well known angular truss design.

It has been found that as the mantle is tapered inwardly to form the upper portion, the openwork or "duplex" stitch becomes increasingly difficult to make and since there was no object in providing well spaced threads at the upper part of the mantle where little or no light radiation is effected, a "simplex" or plain stitch is used, said simplex stitch being far easier to make.

For a clearer understanding of my invention, its objects, advantages and construction, reference is made to the following specifications and the accompanying drawing in which.

Figure 1:
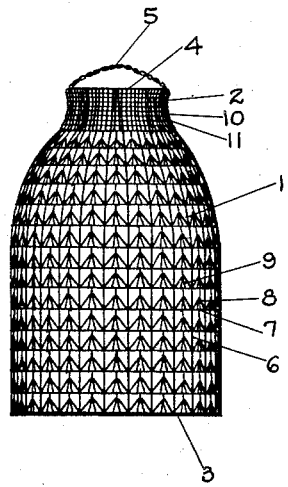
Fig. 1 is a vertical, elevational view of a mantle constructed according to my invention, the design of the stitch being shown semi-diagrammatically.

Referring now to the drawing by numerals of reference, I designates the major body or light radiating portion of the mantle, curving inwardly at its upper end toward the reduced portion 2; the bottom 3 and top 4 being open, with a loop 5 extending transversely of the top 4 to carry the mantle on its holder.

As viewed in Fig. 1 the radiating portion 1 of the mantle, figuratively speaking, comprises vertical lines 6, horizontal lines 7, diagonal braces 8 and intermediate braces 9. The upper portion 2 comprises vertical lines 10 and horizontal lines 11.

Figure 2:
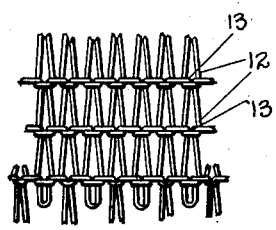
Fig. 2 is an enlarged, detail view of the "simplex" stitch used to form the upper part of the mantle.

The simplex stitch shown in Fig. 2 is well known to the art and is formed from a single thread by a series of bights 12, the upper ends 13 of the consecutive rows of bights passing through the bight immediately above.

Figure 3:
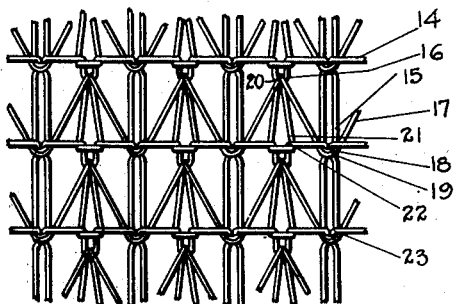
Fig. 3 is an enlarged, detail view of the "duplex" or truss stitch used to form the major light radiating portion of the mantle.

The "duplex" stitch shown in Fig. 3 is formed with two threads, the thread 14 forming a series of alternating long and short bights 15 and 16. The second thread 17 parallels the lower end 18 of bight 15 as shown at 19 and proceeds diagonally upward to pass through short bight 16 as shown at 20 and dropping downwardly to form bight 21 which engages the upper end 22 of the short bight 16 in the adjacent row. The upper ends 23 of the long bights 15 engage the long bights immediately above.

Variations of the stitch described above may be obtained by changing tension on the threads or by adjusting the stroke of the parts of the machine. Fundamentally, however, the stitch design will remain the same, with vertical and horizontal members and diagonals for forming a truss structure and strengthening the entire mantle.

Figure 4:
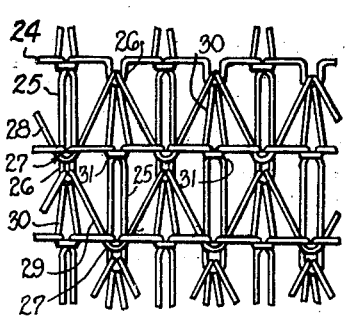
Fig. 4 is a diagrammatic view of a modified form of duplex stitch.

A variation of the duplex stitch is shown in Fig. 4 and employs one thread 24 which forms rows of alternate long and short bights 25 and 26, each row alternating with the adjacent row so that a long bight 25 engages the top of a short bight 26 at 27. The second thread 28 forms diagonals 29 from the short bights 26 to the intersection 27 of the following long and short bights and also drops a bight 30 from the short bight 26 to the top 31 of the long bight in the adjacent row.

Figure 5:
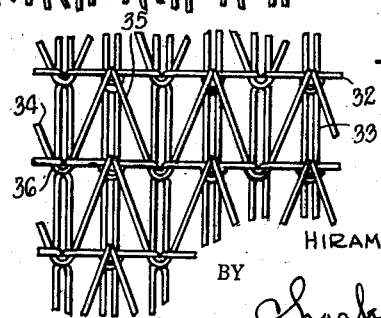
Fig. 5 is a diagrammatic view of another modified form of duplex stitch.

The duplex stitch may also be made as shown in Fig. 5, with one thread 32 forming a series of interconnected bights 33 and the second thread 34 forming diagonals 35 between the intersections 36 of the bights 30.

From the foregoing it will be apparent that I have provided a mantle for incandescent lamps, possessing qualities of high light radiating efficiency, increased strength in physical structure, and economical to manufacture.

What I claim as new and desire to secure by Letters Patent is:

1. A mantle comprising a major, openwork, light radiating portion of duplex stitching forming spaced threads arranged to give maximum light radiating area for each thread, and a supporting portion of simplex stitching having relatively closely arranged threads.

2. A mantle comprising a major, openwork, light radiating portion of duplex stitching forming spaced threads arranged to give maximum light radiating area for each thread, and a supporting portion of simplex stitching having relatively closely arranged threads at the top of the radiating portion.

3. A mantle comprising a major light radiating portion formed of open duplex stitching and tapering inwardly at the top thereof, and a reduced supporting portion formed of close simplex stitching at the top of the radiating portion.

4. A mantle comprising a major light radiating portion formed with two threads, one thread making a plurality of alternating long and short bights, the long bights of adjacent rows being interconnected, a second thread engaging the long bights at their point of intersection and extending diagonally to engage the short bights and forming a bight interconnecting the short bights of the first mentioned thread.

5. A mantle comprising a major light radiating portion formed with two threads, one thread making a plurality of bights, the bights in adjacent rows being interconnected, a second thread engaging the bights at their intersections and extending in alternate diagonal order from one bight intersection to another.

6. A mantle comprising a major light radiating portion formed with two threads, one thread making a plurality of rows of alternating long and short bights, the bights in succeeding rows being staggered, the long bights connected with the upper end of the short bights, and a second thread connected to the intersection of the long and short bights and extending diagonally to engage the adjacent short bight and forming a bight interconnecting the short bight with the top of the long bight in the succeeding row.

7. A mantle comprising a major light radiating portion formed with two threads, one thread making a plurality of bights, certain of the bights in adjacent rows being interconnected, a second thread engaging the interconnected bights and extending diagonally and forming bights interconnecting the remaining bights.

8. A mantle having a major light radiating portion formed of strands providing a plurality of rows of bights having substantially parallel portions with the bights in one row substantially registering with the bights in an adjacent row, and bights extending over alternate registering bights in one row and having diagonal portions interengaged with the intermediate bights of an adjacent row.

9. A mantle having a major light radiating portion formed of threads making a plurality of rows of interconnected bights with the bights in one row substantially registering with the bights in an adjacent row, alternate bights of one row being interengaged with the registering bights of the adjacent row, bights extending over the interengaged portion of said interengaged bights, and bights extending through the intermediate bights of one row and interconnected with the corresponding bights of the adjacent row.

10. A mantle having a portion formed by a thread making a plurality of rows of interconnected bights with the bights in one row substantially registering with the bights in an adjacent row, alternate bights of one row being interengaged with the registering bights of the adjacent row, and a second thread extending over the interengaged portions of said interengaged bights and forming bights extending through the intermediate bights of one row and interengaged with the corresponding bights of the adjacent row.

11. A mantle having an upper closely knit portion formed by a duplex stitch and an interconnected lower light radiating portion formed of strands providing a plurality of rows of bights having substantially parallel portions with the bights in one row substantially registering with the bights in an adjacent row, and bights extending over alternate registering bights in one row and having diagonal portions interengaged with the intermediate bights of an adjacent row.

12. A mantle having an upper closely knit portion formed by a duplex stitch and an interconnected lower light radiating portion formed by a thread making a plurality of rows of interconnected bights with the bights in one row substantially registering with the bights in an adjacent row, alternate bights of one row being interengaged with the registering bights of the adjacent row, and a second thread extending over the interengaged portions of interengaged bights and forming bights extending through the intermediate bights of one row and interengaged with the corresponding bights of an adjacent row.

HIRAM W. STRONG.